US010110536B2

(12) United States Patent
Vincent

(10) Patent No.: US 10,110,536 B2
(45) Date of Patent: Oct. 23, 2018

(54) SYSTEM FOR MANAGING EVENT NOTIFICATIONS TO CLIENT DEVICES

(71) Applicant: Dropbox, Inc., San Francisco, CA (US)

(72) Inventor: Jonathan Vincent, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 141 days.

(21) Appl. No.: 14/257,708

(22) Filed: Apr. 21, 2014

(65) Prior Publication Data

US 2015/0304265 A1 Oct. 22, 2015

(51) Int. Cl.
*G06F 15/16* (2006.01)
*H04L 12/58* (2006.01)

(52) U.S. Cl.
CPC ............. *H04L 51/24* (2013.01); *H04L 51/32* (2013.01)

(58) Field of Classification Search
CPC ........................................................ H04L 51/24
USPC ..... 709/206, 219, 223, 224; 455/406, 435.1; 370/242
See application file for complete search history.

(56) References Cited

U.S. PATENT DOCUMENTS

| 6,763,384 | B1 * | 7/2004 | Gupta | G06Q 30/08 709/224 |
| 6,980,993 | B2 | 12/2005 | Horvitz | |
| 8,165,519 | B2 | 4/2012 | Sato | |
| 8,453,164 | B2 * | 5/2013 | Wang | 719/318 |
| 2003/0101190 | A1 | 5/2003 | Horvitz | |
| 2004/0199592 | A1 * | 10/2004 | Gould | H04L 12/58 709/206 |
| 2005/0050148 | A1 * | 3/2005 | Mohammadioun | H04L 1/1877 709/206 |
| 2006/0026688 | A1 * | 2/2006 | Shah | G06F 21/577 726/25 |
| 2006/0206570 | A1 * | 9/2006 | Heidloff | H04L 51/08 709/206 |
| 2007/0005704 | A1 * | 1/2007 | Heron | H04L 12/1818 709/206 |
| 2007/0047701 | A1 * | 3/2007 | Morris | G06Q 10/10 379/100.08 |
| 2007/0203995 | A1 * | 8/2007 | Wang | H04L 29/06027 709/206 |
| 2007/0233869 | A1 * | 10/2007 | Jodh | H04L 63/10 709/226 |
| 2010/0250681 | A1 * | 9/2010 | Van Wely | G06F 15/16 709/206 |
| 2010/0281150 | A1 * | 11/2010 | Sailhan | H04L 41/0631 709/223 |

(Continued)

*Primary Examiner* — Thuong Nguyen
(74) *Attorney, Agent, or Firm* — Polsinelli PC

(57) ABSTRACT

An online content management service can manage distribution of event notifications to client devices based on notification keys. Client devices can register with the content management service to receive event notifications associated with one or more specific notification keys of interest. The content management service can receive information about events, determine a notification key for each event, and selectively send notifications to clients that are registered for that notification key. The content management service can store event notifications for client devices that are generated during a period when the client device is not in communication with the content management service and can send the missed event notifications to the client device when the client device reestablishes communication with the content management service.

19 Claims, 10 Drawing Sheets

(56) References Cited

U.S. PATENT DOCUMENTS

| | | | | |
|---|---|---|---|---|
| 2012/0117105 A1* | 5/2012 | Thomas | ............... | 707/769 |
| 2012/0254396 A1* | 10/2012 | Prahalad | ............ | H04L 12/1895 |
| | | | | 709/224 |
| 2013/0058221 A1* | 3/2013 | Andersen | ............ | H04L 43/08 |
| | | | | 370/242 |
| 2013/0110943 A1 | 5/2013 | Menon | | |
| 2014/0143395 A1* | 5/2014 | Geltner | ............ | H04L 41/0893 |
| | | | | 709/223 |
| 2014/0188779 A1* | 7/2014 | Sakuraba | ............ | G06N 7/005 |
| | | | | 706/52 |
| 2014/0214983 A1* | 7/2014 | Hossack | ............ | H04L 51/04 |
| | | | | 709/206 |
| 2015/0304265 A1* | 10/2015 | Vincent | ............ | H04L 51/32 |
| | | | | 709/206 |

\* cited by examiner

| Client Identifier | Notification Key(s) | Event Notification Count |
|---|---|---|
| CLIENT1 | CHAT_SUBSCRIBERS; MESSAGE_POSTED | 5 |
| CLIENT2 | CHAT_SUBSCRIBERS | 0 |
| CLIENT3 | CHAT_SUBSCRIBERS; FOLDER_CHANGE | 1 |
| ... | ... | ... |

*FIG. 4*

| Notification Key(s) | Content Change | Command |
|---|---|---|
| CHAT_SUBSCRIBERS | BOB | ADD |
| MESSAGE_POSTED | message1 | POST |
| ... | ... | ... |

*FIG. 5A*

| Notification Key | Content Change | Command | Recipient |
|---|---|---|---|
| CHAT_SUBSCRIBERS | BOB | ADD | CLIENT1, CLIENT2 |

*FIG. 5B*

SYSTEM FOR MANAGING EVENT NOTIFICATIONS TO CLIENT DEVICES

BACKGROUND

The present disclosure relates generally to an online content management service, and more specifically to management of notifications to client devices about events that occur in a content management system.

An online content management service can allow users to access and manage content across multiple devices using the Internet. In an online content management service, a user can establish an account with the service provider and can associate various content items with the account. For example, some online content management services may allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users intereseted in content maintained by the service provider can access the online content management service to receive updates about changes in content or other types of notifications related to activity associated with content managed by the online content management service. The online content management service can provide updates about activity of other users; for instance, in a social network, status updates or other content items posted by one user can be propagated to other users who have indicated interest in receiving them.

With the proliferation of mobile computing devices, many users can access content managed by an online content management service from a variety of clients, such as web browsers, desktop application programs, and mobile-device apps. An increase in the number of devices can lead to an increase in a number of notifications to be managed. Managing distribution of notifications can present challenges for an online content management service provider.

SUMMARY

Certain embodiments of the present invention relate to management and distribution of event notifications to client devices and/or computing platforms that interact with an online content management service. An event notification can indicate event-related information about an occurrence of an event in a content management system. As used herein, an "event" can include any type of activity (e.g., system activity or user activity) that occurs in a content management system. Event notifications can be associated with one or more notification keys, each a unique value that can identify a particular type of event that can occur in a content management system. A client device that accesses an online content management service can register to receive event notifications associated with one or more notification keys.

The online content management service can distribute event notifications to client devices according to notification keys registered for each of the client devices. A client device can request the online content management service to register for one or more notification keys corresponding to event notifications of interest. The online content management service can assign a unique client identifier to each client device that registers to receive event notifications. The notification keys registered for a client device can be stored in association with the client identifier for the client device. When an event notification is generated that corresponds to a notification key, the online content management service can send the event notification to each client device registered for the corresponding notification key.

In certain embodiments, the online content management service can temporarily store an event notification for later delivery to client devices that are registered to receive the event notification but that are not currently connected to the online content management service at the time that the event notification is generated. In some embodiments, the online content management service can begin to store event notifications for a client device when the online content management service discovers that it cannot communicate with the client device. Event notifications can be stored in association with a client identifier that distinguishes one client device from another client device to the online content management service.

Upon reestablishing communication with the online content management service, a client device can receive any stored event notifications that were missed during a time when the client device could not communicate with the online content management service. Using the client identifier for the client device, the online content management service can identify event notifications that were not delivered to the client device and can proceed to deliver some or all of these event notifications.

Certain aspects of the invention relate to servers and methods executable at servers. One or more of the servers (e.g., a server computer) can implement an online content management service. For example, a server can receive a request to register a client device for a notification key. A notification key can correspond to one or more types of events in a content management system. In response to the request, the server can store an association between the notification key and the client device. The server can receive information about an event that occurs in a content management system. An event can be of a type of event corresponding to a notification key. Before distributing a notification to a client device, the server can determine whether the client device is in communication with the server. In response to determining that the client device is in communication with the server, the server can send an event notification about the event to the client device. In response to determining that the client device is not in communication with the server, the server can store information about the event notification in association with a client identifier of the client device. The client identifier can enable the online content management service to identify event notifications that were not communicated to the client device and to deliver notifications later, e.g., when the client reconnects.

The following detailed description together with the accompanying drawings will provide a better understanding of the nature and advantages of the present invention.

BRIEF DESCRIPTION OF THE DRAWINGS

FIG. 4 shows a data structure to store client registration information for managing distribution of event notifications according to an embodiment of the present invention.

FIG. 5A shows a data structure to store notification records for managing distribution of event notifications according to an embodiment of the present invention.

FIG. 5B shows a data structure of an event notification according to an embodiment of the present invention.

DETAILED DESCRIPTION

Figure 1:
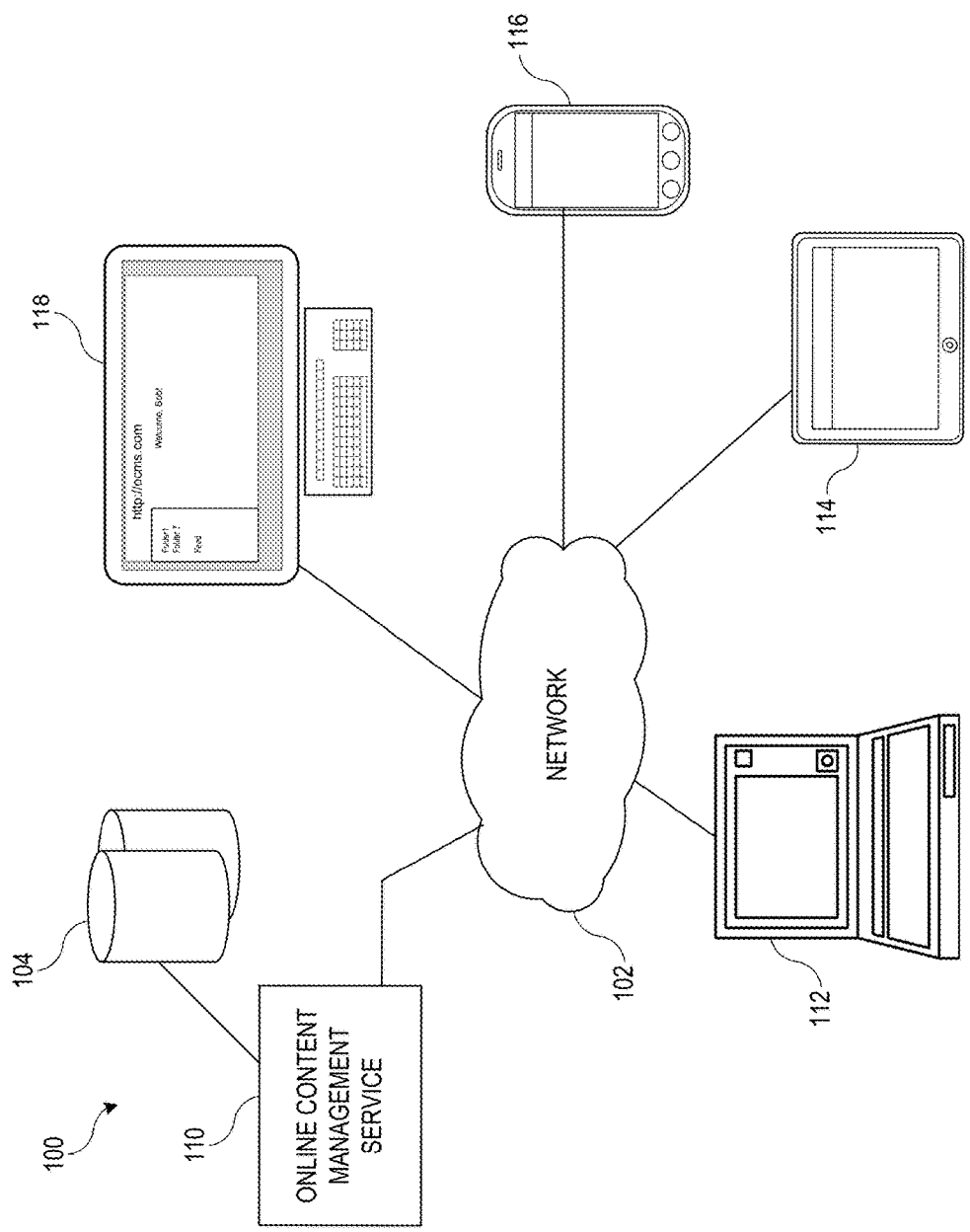
FIG. 1 shows an online content management system that can distribute event notifications to client devices and/or computing platforms that interact with an online content management service according to an embodiment of the present invention.

The following description of certain embodiments of the invention is not intended to limit the invention to these embodiments, but rather to enable any person skilled in the art to make and use this invention.

Certain embodiments of the present invention relate to management and distribution of event notifications to client devices and/or computing platforms that interact with an online content management service. An event notification can indicate event-related information about an occurrence of an event in a content management system. As used herein, an "event" can include any type of activity (e.g., system activity or user activity) that occurs in a content management system. Event notifications can be associated with one or more notification keys. A notification key can be a unique value that is used to identify a particular type of event in a content management system. A client device that accesses an online content management service can register to receive event notifications associated with one or more notification keys.

The online content management service can distribute event notifications to client devices according to notification keys registered for each of the client devices. A client device can request the online content management service to register for one or more notification keys corresponding to event notifications of interest. The online content management service can assign a unique client identifier to each client device that registers to receive event notifications. The notification keys registered for a client device can be stored in association with the client identifier for the client device. When an event notification is generated that corresponds to a notification key, the online content management service can send the event notification to each client device registered for the corresponding notification key.

In certain embodiments, the online content management service can temporarily store an event notification for later delivery to client devices that are registered to receive the event notification but that are not currently connected to the online content management service at the time that the event notification is generated. In some embodiments, the online content management service can begin to store event notifications for a client device when the online content management service discovers that it cannot communicate with the client device. Event notifications can be stored in association with a client identifier that distinguishes one client device from another client device to the online content management service.

Upon reestablishing communication with the online content management service, a client device can receive any stored event notifications that were missed during a time when the client device could not communicate with the online content management service. Using the client identifier for the client device, the online content management service can identify event notifications that were not delivered to the client device and can proceed to deliver some or all of these event notifications.

FIG. 1 shows a system 100 (e.g., a content management system) that can distribute of event notifications to client devices 112, 114, 116, 118 and/or computing platforms that interact with online content management service 110 according to an embodiment of the present invention. Online content management service 110 can be communicably coupled to one or more data stores 104. Client 112, client 114, client 116, client 118, and online content management service 110 can be communicatively coupled via network 102. Network 102 can be, for example, the Internet, a mobile network, a wireless network, a cellular network, other communication networks, or a combination thereof.

Online content management service 110 can include, for example, a file storage service, a file sharing service, a social media service that allows users to post messages and/or other content, and so on. Online content management service 110 can be hosted on servers maintained by a service provider and accessed via a network 102, such as the Internet. In some embodiments, online content management service 110 can store content in one or more data sources 104 (e.g., a database). The content can include audio, video, data, images, files, email messages, and the like.

Users in system 100 can access online content management service 110 by operating various clients 112, 114, 116, 118. As used herein, a "client" refers generally to a combination of computer hardware and software that enables a user to interact with online content management service 110. For example, client 112 can be a desktop or laptop computer executing a web browser (e.g., Internet Explorer, Google Chrome, or Safari) that communicates with online content management service 110 using web protocols such as HTTP (Hypertext Transfer Protocol). Client 112 can be a desktop or laptop computer executing an application program provided by the provider of online content management service 110. In some instances where the online content management service provides access to files, the application program may allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients.

Other examples of clients include mobile devices, e.g., tablet computer 114 and mobile phone 116, which can execute application programs (also referred to as "apps") that communicate with online content management service 100. At various times, a user may be interacting with one or more of clients 110, 112, 114, 116, 118. However, a client is not limited to illustrated embodiments as clients 112, 114, 116, 118 and can take any form that can enable a user to interact with online content management service 110.

In some embodiments, online content management service 110 can provide notifications of events that may be of interest to the user and/or to the client(s) 112, 114, 116, 118. As used herein, an "event" can include any type of activity (e.g., system activity or user activity) that occurs in system 100. In certain embodiments, events can occur at one or one more clients 112, 114, 116, 118, online content management service 110, or a combination thereof.

The following are examples of events for which a notification can be provided in content management system 100. In one example, an event can be related to activity, such as a change (e.g., an update, a modification, or a removal) in a content item (e.g., audio, video, an image, or the like). In another example, an event can be a change in a status (e.g., join/leave or sign/signoff) of a user for an application (e.g., such as a chat application). In yet another example, if a user has access to a shared folder that contains files and another user modifies a file in the shared folder, online content management service 110 can provide a notification. As yet another example, a second user may offer the user an opportunity to share content, e.g., by inviting the user to "join" a shared folder created or managed by the second user. In some embodiments, event notifications are provided to all clients 112, 114, 116, 118 associated with the user, regardless of which platform(s) the user is currently interacting with.

Subsequently to being notified of an event, a user operating a client device (or another user) may take action with regard to the event, and this action may constitute another event. For example, in response to receiving an invitation to join a shared folder, the user may accept or decline the invitation, or the inviting user may withdraw the invitation before the recipient user can accept. These actions may constitute further events for which notifications can be generated.

As used herein, a "notification" and an "event notification" refer generally to event-related information provided by a service to one or more clients. In some embodiments, a client may make some or all of its received notifications visible (or perceptible) to its user. For example, the client may display a visual indicator that a notification has been received, display text descriptive of the notification (e.g., "Joe invited you to share Folder3"), play a sound, vibrate, speak words descriptive of the notification, and so on. The term "alert" is used herein to refer to a user-visible (perceptible) form of a notification.

Online content management service 110 can manage distribution of event notifications to a client (e.g., client 112, client 114, client 116, or client 118) by assigning one or more types to each event for classification. Although many events can occur in a system, each user may be interested only in certain events. In certain embodiments, online management service 110 can assign a key (e.g., a notification key) that indicates a type of event. By classifying the events, online content management service 110 can selectively determine which clients to send notifications to regarding the events.

For example, online management service 110 can assign a notification key having a value of "CHAT_SUBSCRIBERS" to events related to a change in subscribers, e.g., a change in subscribers joined or operating a chat application. When a chat subscriber leaves or joins the chat application, an event notification can be generated corresponding to a change in the subscribers and "CHAT_SUBSCRIBERS" notification key can be assigned to the event notification. In another example, online content management service 110 can define a notification key having a value of "MODIFY_FOLDER." "MODIFY_FOLDER" can be assigned to notifications about events related to modification of a shared folder. When a user modifies a shared folder, an event notification can be generated indicating the modification of the shared folder and "MODIFY_FOLDER" notification key can be assigned to the event notification.

In certain embodiments, online content management service 110 can determine which event notifications to send to a client using the notification keys registered for that client. A client can register one or more notification keys with online content management service 110 to indicate the types of events for which notifications are to be provided to the client. By indicating interest in certain types of events, a client can avoid receiving a notification about every event occurring in system 100, and instead can receive notifications only about events that the client (or a user of the client) is interested in. Just as a client can register for one or more notification keys, a client can deregister for notification keys that the client may no longer be interested in. By deregistering a client for notification keys, the client is no longer registered to receive notifications about events of a type that corresponds to a deregistered notification key. However, while a client may deregister from receiving notifications about a certain type of event, a client may still receive notifications about other events, which may be assigned other notification keys that are still registered for the client. Thus, each client can dynamically control which types of notifications it receives by registering and/or deregistering for various notification keys.

When an event occurs, online content management service 110 can generate an event notification for the event. Online content management service 110 can assign one or more notification keys to the event notification based on a classification of the event. Clients, e.g., client 112, which can communicate with online content management service 110 can receive the event notification if they have registered to receive event notifications for one of the notification keys assigned to the event notification. Once an event notification is generated, online content management service 110 can send the event notification to each client device registered for a notification key assigned to the event notification.

In some embodiments, a client (e.g., clients 112-118) can lose communication with online content management service 110 for a variety of reasons (e.g., loss of signal or change in communication mode). In such embodiments, in the event that online content management service 110 determines that it does not have communication with a client when the event notification is generated, online content management service 110 can temporarily store the event notification (e.g., as a "missed" event notification) for later delivery to the client. In some embodiments, content management service 110 may attempt to send an event notification to a client before determining that the client no longer has communication with online content management service 110. Content management service 110 may later discover that it does not have communication with the client because it has not received a communication or response from the client. In this case, content management service 110 may determine that the event notification was not received, and therefore, is a missed event notification. Missed event notifications can be stored in association with a client identifier or other identifier that distinguishes the client device from other client devices in system 100.

Upon reestablishing communication with online content management service, a client can receive any stored missed event notifications. Using the client identifier for the client, online content management service 110 can identify the missed event notifications that were not delivered to the client device and can deliver all or some of the missed event notifications.

Thus, by sending clients event notifications based on registration for notification keys, a content management system can efficiently manage notifications by sending notifications to a given client only for events of interest to that client. Further, storing notifications about events in association with a notification key can reduce storage requirements for the content management system. A single instance of an event notification can be managed and relied upon for distribution amongst clients that have registered for notification keys associated with the event notification. Often times, mobile devices can periodically lose communication capabilities. An online content management service (e.g., content management service 110) that can provide a client device with event notifications that were missed during a period when communication is lost can allow the client to "catch up" on events of interest once communication is restored.

Figure 2:
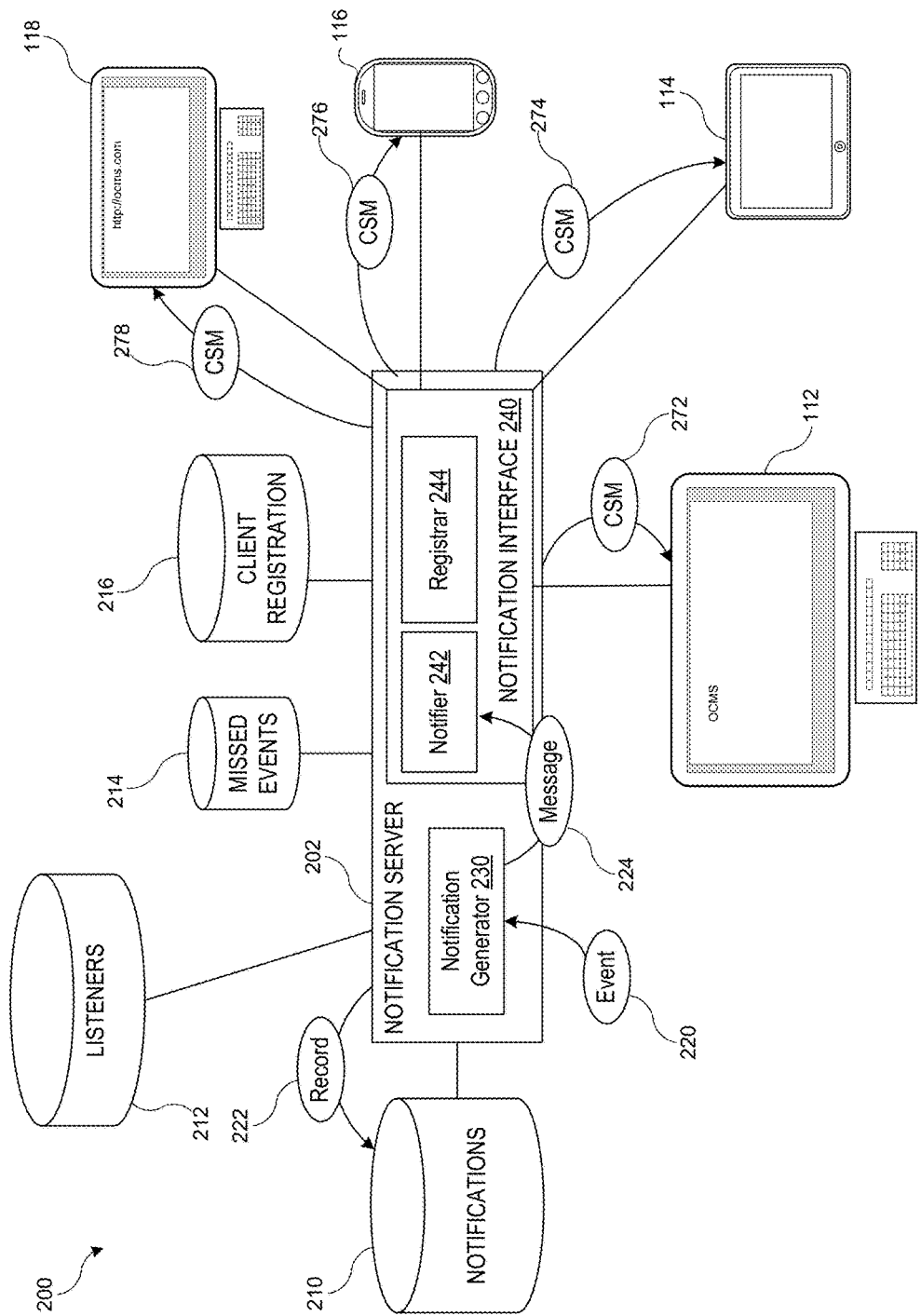
FIG. 2 shows a system that can distribute event notifications to client devices according to some embodiments of the present invention.

FIG. 2 shows a system 200 for distributing event notifications to clients 112, 114, 116, 118 of FIG. 1 according to an embodiment of the present invention. System 200 can include notification server 202. Notification server 202 can be maintained and/or operated by a provider of online content management service 110 of FIG. 1.

Notification server 202 can be communicably coupled to one or more data stores including notifications data store 210, missed events data store 214, and client registration data store 216. Each data store 210, 214, 216 in online content management service 110 can be implemented using any type of persistent storage device, such as a memory storage device or other computer-readable storage medium. In a particular embodiment, one or more of data stores 210, 214, 216 can be implemented using a document database, a relational database, or other type of database.

Notification server 202 can implement operations to generate event notifications and promulgate these event notifications to clients, examples of which are described below. In some embodiments, notification server 202 can be implemented as one or more software (code) modules executing on suitable computer hardware, such as a server. In some instances, notification server 202 can be physically or logically distinct from other servers that perform operations related to other aspects of online content management service 110 such as content management (e.g., file storage and retrieval) and/or user account management (e.g., creating and updating user accounts, billing, etc.).

Notification server 202 can be capable of detecting an event for which a notification should be generated. In some embodiments, events can be detected based on event information 220 sent to notification server 202 by other computing devices. For example, other servers associated with online content management service 110, such as a user account server or a content management server can send event information 220 to notification server 202 based on activity occurring at those servers. In some embodiments, a client (e.g., client 112, client 114, client 116, or client 118) in communication with notification server 202 can send event information 220 to notification server 202 for events occurring within a client. Event information 220 can be any structured object that represents information about an occurrence of an event in a content management system. For example, referring to the example above about chat subscribers, event information can indicate a change in a number of chat subscribers for a chat application.

Notification server 202 can include notification generator 230 to generate notification record 222 based on event information 220. Notification generator 230 can store notification record 222 in notifications data store 210. Notification record 222 can include a row in a database table, or any structured data object, that represents event information 222 in a manner that makes a particular notification readily retrievable by server 202 in response to a request from a client. Using event information 220, notification generator 230 can determine the type of events for the event identified in event information 220. Based on the type of events, notification generator 230 can determine one or more notification keys applicable to the event. The determined notification keys can be stored in notification record 222. An example structure for notification record 222 is described below with reference to FIG. 5A.

In certain embodiments, notification record 222 can include information about the content that is the subject of notification. Referring to the example earlier of "CHAT_SUBSCRIBERS" notification key, the content can be a list of user identifiers (user IDs) of currently subscribed users. Notification record 222 for an event in which a user subscribes to the chat program can include information such as the user ID of the new subscriber. Notification record 222 can include a command or information to indicate a change to content for the notification. Rather than having to store all information or content (e.g., all chat subscribers) relevant to the notification key, notification record 222 can store content that is added or changed for the notification key and information indicating how the content has changed. An event notification provided to a client can include information in notification record 222 to enable a client to change its presentation of content based on the notification.

In certain embodiments, a notification key can be defined by an element in content management system 100. Once a new notification key is defined, content management service 110 and clients can be informed of the new notification key. In some embodiments, a notification key can be defined dynamically as new types of events are discovered or need classification. By notifying all elements in content management system 100, duplication of notification keys can be avoided. However, to maintain consistency of storage for notifications and to avoid inconsistent or duplicate use of notification keys, client 112, 114, 116, 118 and content management service 110 can negotiate for definition and use of notification keys.

Notification server 202 can store information about notification keys in notifications data store 210. A notification key can be stored in a notification key record. A notification key record can include a row in a database table, or any structured data object, that represents a definition of a notification key in a manner that makes information about the notification key readily retrievable by server 202. For example, a notification key record can include a value of a notification key (e.g. "CHAT SUBSCRIBERS") and information that describes a type of event classified for the notification key. Clients 112, 114, 116, 118 and content management service 110 can access a shared data store (e.g., notifications data store 210) that can store notification keys defined within content management system 100. Notifications data store 210 can be searched to determine whether a notification key already exists before a new notification key is created.

Notification server 202 can include notification interface 240 to manage communication with one or more clients (e.g., client 112, client 114, client 116, or client 118) about events detected by notification server 202. Notification interface 240 can promulgate messages to clients to notify the clients about an event notification corresponding to each generated notification record 222. In some embodiments, notification generator 230 can generate and send a message 224 to instruct notification interface 240 to communicate to clients an event notification corresponding to notification record 222. Message 224 can, but need not, contain the actual information in notification record 222. In some embodiments, message 224 can simply indicate the existence of a notification record 222 and provide information usable to route message 224 to a client and to allow a receiving client to retrieve notification record 222 from a data store, e.g., notifications data store 210. In some embodiments, message 224 can include the notification key stored in record 222 to enable notification interface 240 to identify which clients should be notified of notification record 222. An example structure for message 224 is described below with reference to FIG. 5B.

Notification interface 240 can send messages to clients 112, 114, 116, 118 that have registered to receive notifications about certain types of events. Notification interface 240 can include registrar 244 to manage registration and deregistration of clients for one or more notification keys. Notification interface 240 can receive requests from one or more clients to register or deregister for notifications about different notification keys.

Registrar 244 can generate a unique identifier, e.g., a client identifier, for each client that communicates with notification server 202. A client identifier can be generated the first time a request is received from a client to register for notifications. The client identifier can uniquely identify each registered client. The unique identifier can be stored in client registration date store 216 in association with the notification keys currently registered for each client. Client registration data store 216 can store information about each client registered to receive notifications for certain types of events. Client registration data store 216 can be implemented, e.g., using a database or any other data storage technology and a computer-readable storage medium.

Registrar 244 can generate and store a registration record in client registration data store 216 for each client registered for one or more notification keys. A registration record can include a client identifier of a client and one or more notification keys registered for the client. A registration record can include a row in a database table, or any structured data object. For subsequent requests from the same client to register for additional notifications, registrar 240 can add notification keys identified in a request to the record corresponding to that client. To deregister a client for a notification key, registrar 244 can update a registration record for the client to remove the notification key. By removing a notification key from the registration record, notification server 202 can avoid sending a notification for a type of events corresponding to the removed notification key. Thus, each client can independently and dynamically register and unregister for various notification keys.

Notification interface 240 can include notifier 242, which can manage communication of a notification to clients for message 224 received from notification generator 230. Notifier 242 can identify clients that have registered for a particular notification key, e.g., by querying client registration data store 216. Notifier 242 can communicate messages (e.g., message 224) to the identified clients.

Notifier 242 can manage a message queue for delivery of messages, e.g., message 224, to clients. Delivery of message 224 to a client can be accomplished in a client-specific manner, using dispatchers, such as a mobile dispatcher, a web dispatcher, and a desktop dispatcher, each of which can independently detect a message (e.g., message 224) in the message queue and push a corresponding client-specific message (CSM) (e.g., CSM 272, 274, 276, 278) to clients using appropriate technologies. Client-specific messages can be (but need not be) identical in structure and/or content to message 224. The format and content of a particular client-specific message can be adapted to the delivery protocol used for that client. As long as the client-specific message includes reference information usable to locate the corresponding notification record in notifications data store 210, a client will be able to retrieve the notification record as described below.

For example, mobile platforms such as tablet computers (e.g., client 114) and mobile phones (e.g., client 116) can rely on push notification services associated with their operating systems to deliver client-specific messages (e.g., CSM 274 and CSM 276) to specific devices. Examples of push notification services include Apple Push Notification Service (APNS), operated by Apple Inc. and associated with devices running the iOS operating system, and Google Cloud Messaging (GCM), operated by Google, Inc., and associated with devices running the Android operating system.

A web dispatcher can deliver client-specific message 278 (e.g., via the Internet (not explicitly shown)) to active web clients, such as client 118, using technologies such as long pulling.

A desktop dispatcher can deliver client-specific message 272 (e.g., via the Internet) to active desktop clients, such as client 112. Various techniques can be used depending on the specific communication protocols established between desktop client 112 and the online content management service; examples include long pulling, polling of the dispatcher by the desktop client, HTTP server push, and so on.

In some embodiments, notification interface 240 can periodically purge its message queue of old messages (e.g., messages can expire after some fixed time period such as a day or a week) and/or messages that are known to have been delivered to all registered clients.

In response to receiving a client-specific message corresponding to message 224, a receiving client can request a corresponding notification record 222 from notification data store 210, e.g., by sending a request to server 202 or another server (not shown), using information contained in the received client-specific message to identify the record of interest.

In some embodiments, notification server 202 can lose communication with a client for a variety of reasons. For example, client 116 can lose communication with notification server 202 when client 116 loses communication capabilities such as when communication hardware is disabled (e.g., a transceiver is turned off). In another example, client 116 can lose communication when client 116 loses connectivity (e.g., moves out of signaling range) or encounters an error/failure in a transmission path to notification server 202. In any event, when a client loses communication with notification server 202, notification server 202 cannot communicate messages (e.g., message 224) to the client to indicate an event notification during the period when communication is lost. Such event notifications that cannot be received by the clients, and are therefore missed are referred to herein as "missed event notifications." In some embodiments, a missed event notification can include a message (e.g., message 224) that notification server 202 attempted to communicate to a client, but that was not delivered to the client due to a loss of communication between the client and notification server 202. In the event that notification server 202 determines that it cannot communicate with a client to send a message about an event notification, notification server 202 can temporarily store a missed event notification for later delivery to the client.

System 200 can include a missed events data store 214, which can be implemented, e.g., using a database or any other data storage technology and a suitable computer-readable storage medium. Notifier 242 can store information about missed event notifications for a client in a missed notification record in association with a client identifier generated by registrar 244. In some embodiments, a missed notification record can store a client identifier in association with a reference to notification record 222 for an event notification that was missed. In the event that multiple clients missed an event notification, the missed event notification can be stored in association with client identifiers for each client that missed the event notification.

In certain embodiments, notifier 242 can manage storage of information about the missed event notifications based on one or more criteria. The criteria can be based on a storage capacity, such that notifier 242 can store information about missed event notification until a maximum storage capacity is reached. In some embodiments, the maximum storage capacity can be based on a maximum number of event notifications. The storage capacity can be managed individually with respect to each registered client, or collectively based on a maximum capacity for storing information about missed event notifications for all registered clients.

In some embodiments, information about each missed event notification can be stored in missed events data store 214 in association with a time and date. The time and date can be used as criteria to determine when each missed event notification was stored. The time and date can enable notifier 242 to determine when to remove missed event notifications. For example, information about missed event notifications can be removed from missed events data store 214 after a period of time (e.g., a day, a month, a year, etc.) to conserve storage space. A missed notification record can be removed from missed events data store 214 sooner if the missed event notifications is successfully sent to the client. In some embodiments, an association between a particular client identifier and information about a missed event notification can be removed when the identified client is provided with the missed event notification.

In certain embodiments, notifications can expire after a client has remained disconnected from notification server 202 within a time period. For example, if the client does not reestablish communication with notification server 202 after a time period during which the identified client fails to reestablish communication with notification server 202, notification server 202 can remove all associations between the client identifier and the missed notification records. Notification server 202 can check periodically or intermittently to determine whether the client has reestablished communication with notification server 202. The time and date stored in association with missed notification record can be used to assess how long the missed notification record has been stored so that it can accordingly be removed once an expiration time has been reached. By removing missed notification records after a condition has been satisfied (e.g., expiration of the missed notification records or the existence of a period during which the identified client fails to reestablish communication with notification server 202), notification server 202 can further reduce the amount of storage required to manage event notifications.

Upon reestablishing communication with notification server 202, a client can receive missed event notifications. Using the client identifier for the client, notifier 242 can access missed events data store 214 to retrieve missed event notifications that were not received by that client. For example, notifier 242 can retrieve missed notification records that identify notification records 222 for event notifications that were missed. Notifier 242 can deliver all or some of the missed event notifications identified based on the missed notification records. In some embodiments, after re-establishing communication with notification server 202, client can send a request for missed event notifications. Notifier 242 can retrieve and deliver missed event notifications to the client in response to receiving the request.

Figure 3:
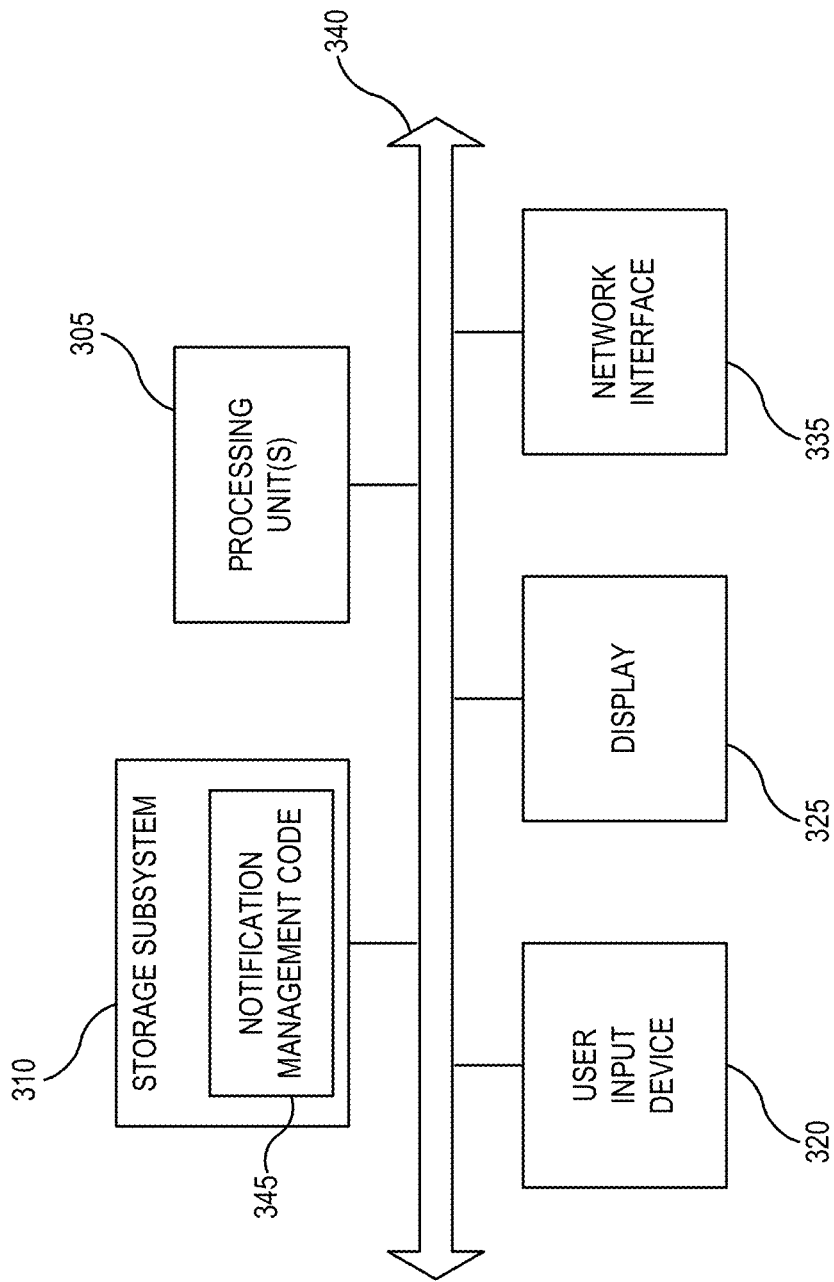
FIG. 3 shows a simplified block diagram illustrating a representative computer system of an embodiment of the present invention.

Various operations described herein can be implemented on computer systems, which can be of generally conventional design. FIG. 3 shows a simplified block diagram of a representative computer system 300 according to an embodiment of the present invention. Specifically, computer system 300 can be included in one or both of a client (e.g., client 112, client 114, client 116, or client 118) or content management service 110.

Computer system 300 can include processing unit(s) 305, storage subsystem 310, input devices 320, display 325, network interfaces in 335, and bus 340. Computer system 300 is a high-level block diagram of a system that can represent a mobile device, a server computer, or any of the computing devices illustrated in FIGS. 1-2 and described herein.

Processing unit(s) 305 can include a single processor, which can have one or more cores, or multiple processors. In some embodiments, processing unit(s) 305 can include a general-purpose primary processor as well as one or more special-purpose co-processors such as graphics processors, digital signal processors, or the like.

Storage subsystem 310 can include various memory units such as a system memory, a read-only memory (ROM), and a persistent storage device. A ROM can store static data and instructions that are used by processing unit(s) 305 and other modules of electronic device 300. A persistent storage device can be a non-volatile readable and writable memory unit that stores instructions and data even when computer system 300 is powered down. System memory can be implemented using volatile read-and-write memory, such as dynamic random access memory, or non-volatile memory as desired. The system memory can store some or all of the instructions and data that are currently in use by processing unit(s) 305.

Storage subsystem 310 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 310 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 310 can store one or more software programs to be executed by processing unit(s) 305, such as notification management code 345. For example, notification management code 345 can implement operations or methods described herein as implemented by content management service 110 for management and distribution of event notifications. "Software" refers generally to sequences of instructions that, when executed by processing unit(s) 305, cause computer system 300 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 310, processing unit(s) 305 can retrieve program instructions to execute and data to process in order to execute various operations described herein. Through suitable programming, processing unit(s) 305 can provide various functionality for computer system 300. For example, processing unit(s) 305 can execute notification management code 345.

A user interface can be provided by one or more user input devices 320, display device 325, and/or and one or more other user output devices (not shown). Input devices 320 can include any device via which a user can provide signals to computing system 300; computing system 300 can interpret the signals as indicative of particular user requests or information.

Display 325 can display images generated by computer system 300 and can include various image generation technologies. Some embodiments can include a device such as a touchscreen that functions as both touch-sensitive input device and display device. In some embodiments, other user output devices can be provided in addition to or instead of display 325.

In some embodiments, the user interface can provide a graphical user interface, in which visible image elements in certain areas of display 325 are defined as active elements or control elements that the user selects using user input devices 320. For example, the user can manipulate a user input device to position an on-screen cursor or pointer over the control element, then click a button or tap a touch-sensitive surface to indicate the selection. Alternatively, the user can touch the control element (e.g., with a finger or stylus) on a touchscreen device. Other user interfaces can also be implemented.

Network interface 335 can provide voice and/or data communication capability for computer system 300. In some embodiments, network interface 335 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 335 can provide wired network connectivity (e.g., Ethernet) in addition to or instead of a wireless interface. Network interface 335 can be implemented using a combination of hardware (e.g., antennas, modulators/demodulators, encoders/decoders, and other analog and/or digital signal processing circuits) and software components.

Bus 340 can include various system, peripheral, and chipset buses that communicatively connect the numerous internal devices of computer system 300. For example, bus 340 can communicatively couple processing unit(s) 305 with storage subsystem 310. Storage subsystem 310 can include notification management code 345 that is configured to cause the processing unit(s) 305 to manage threads as described herein. Bus 340 also connects to input devices 320 and display 325. Bus 340 also couples computer system 300 to a network through network interface 335. In this manner, computer system 300 can be a part of a network of multiple computer systems (e.g., a local area network (LAN), a wide area network (WAN), an Intranet, or a network of networks, such as the Internet. Any or all components of computer system 300 can be used in some embodiments of the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

In some embodiments, computer system 300 or a similar system can also implement notifications server 202. In such instances, a user interface may be located remotely from processing unit(s) 305 and/or storage subsystem 310; similarly, storage subsystem 310 or portions thereof may be located remotely from processing unit(s) 305. Accordingly, in some instances, various components of computer system 300 need not be physically located in any particular proximity to each other.

It will be appreciated that computer system 300 is illustrative and that variations and modifications are possible. Computer system 300 can have other capabilities not specifically described here (e.g., mobile phone, global positioning system (GPS), power management, one or more cameras, various connection ports for connecting external devices or accessories, etc.). Further, while computer system 300 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

FIG. 4 shows a data structure 400 to store client registration information for managing distribution of event notifications according to an embodiment of the present invention. Data structure 400 can be included in client registration data store 304. Specifically, data structure 400 can store information associated with one or more clients (e.g., client 112) registered to receive event notifications in content management system 100. The contents for data structure 400 as shown as examples of one format of many for storing client registration information in client registration data store 404.

Data structure 400 can contain one or more registration records (e.g., record 402, record 404, and record 406). Each registration record 402, 404, 406 can store information about a client that has previously registered with online content management service 110 to receive event notifications. Each registration record 402, 404, 406 can include one or more fields (e.g., field 410, field 420, field 430, field 440, and field 450) containing information about a client registered with online content management service 110. For example, records 402, 404, and 406 can be generated for client 112, client 114, and client 116, respectively.

A client identifier field 410 in a registration record can identify a client for which the record was generated. The client identifier can be any identifier that distinguishes one client from other clients that have registered with online content management service 110. For example, record 402 has a value of "CLIENT1" for field 410 and identifier "CLIENT1" can be assigned to a specific client, e.g., client 112.

A notification key(s) field 420 can indicate one or more notification keys for which the client is currently registered. For example, record 402 can have values of "CHAT_SUB-SCRIBERS" and "MESSAGE POSTED" in field 420, each of which indicates a notification key registered for client 1.

An event notification count field 430 in a record can indicate a count of event notifications that have been sent to the client during a time period when notification server 202 has communication with the client. The count can be maintained within registration data record for the client. In certain embodiments, notification server 202 can maintain a count of event notifications that have been sent to each client to determine later (e.g., when a client reestablishes communication with notification server 202) whether notification server 202 should send missed event notifications that have been stored. Similarly, the client can maintain a count of event notifications it receives when it can communicate with notification server 202. Subsequently to establishing communication with notification server 202, a client can provide notification server 202 with a count of event notifications it has received.

To determine whether to send missed event notifications to a client, notification server 202 can compare its count of event notifications sent to the client with the count of event notifications previously received by the client. Based on comparison of the counts, notification server 202 can determine whether it has stored the correct number of missed event notifications. The counts can be expected to match unless notification server 202 saves one or more notifications that were not received by the client. When the counts match, notification server 202 can send the client the missed event notifications that were stored for the client. In some cases, the counts may differ because notification server 202 may count event notifications it attempted to send before determining that it cannot communicate with the client. In such a case, a threshold can be defined to accommodate for the difference in counts. In certain embodiments, when the counts do not match, notification server 202 can still send the missed event notifications even when the counts differ by at least the threshold number.

In some embodiments, notification server 202 can purge information about missed event notifications in different conditions to conserve storage of missed event notifications. For example, when the counts differ by more than the threshold number, notification server 202 can purge information stored for the client with respect to missed event notifications. In another example, notification server 202 can remove information stored about missed event notifications for the client the registered client fails to reestablish communication with notification server 202 before an expiration time. To remove information stored about missed event notifications, notification server 202 can remove any association between the registered client and the notification records for event notifications missed by that client.

FIG. 5A shows a data structure 500 to store notification records for managing distribution of event notifications according to an embodiment of the present invention. Data structure 500 can be included in notifications data store 210. Specifically, data structure 500 can store one or more notification records (e.g., record 222 of FIG. 2) generated by notification server 202. The contents for data structure 500 as shown as examples of one format of many for storing one or more notification records in notifications data store 210.

Data structure 500 can contain one or more notification records (e.g., record 502 and record 504). Each notification record can be generated based on event information (e.g., event information 222) received by notification server 202. Each notification record 502, 504 can include one or more fields containing information about an event that occurs in a content management system. To illustrate, notification key field 510 of a notification record can indicate a notification key associated with an event.

In certain embodiments, a notification record can indicate an event that occurs, such as a change in content. For example, content change field 520 can indicate a change in content for content associated with the notification key in notification key field 510. In some embodiments, content change field 520 can include content that changes with respect to the notification key. When the event is a new chat subscriber, content change field 520 can include information such as the identifier of the newly subscribed user. In FIG. 5A, content change field 520 in notification record 502 includes a user identifier (e.g., "BOB") of the new subscriber.

In certain embodiments, a notification record can indicate a command or information indicating how a client should apply the changed content information when an event notification is received based on the notification record. For example, in notification record 502, command field 530 includes a command, "ADD", which indicates that information such as "BOB" in content change field 520 is to be added to content or information presented about subscribers to a chat application.

In another example, notification record 504 can include notification key "MESSAGE_POSTED" in notification key field 510, which is associated with a change in messages posted in a chat application program. Notification record 504 can include content, such as a message, e.g., "message1", in content change field 520 which is the basis of an event associated with recent message posted in the chat application program. Command field 530 in event record 504 can include a "post" command, which notifies a client to update content displayed in a chat application program by posting "message1" included in content change field 520.

Alternatively or additionally, each notification record can store a date and/or time indicating an occurrence of an event associated with an notification record. Notification server 202 can use information about event notifications associated with a certain notification key and a particular time and/or date range to update clients with event notification that were missed.

Each notification record can include a source identifier that indicates a source (e.g., online content management service 110 or content source 104) that originated the event identified by the notification record. The source identifier can be obtained from the event information for an event. The source identifier can be specified in an event notification. Using the source identifier, a client can communicate with the source to obtain further information about an event or to receive content or information that changed as a result of the event. In this manner, the amount of data in an event notification can be reduced, thereby reducing the amount of data communicated to clients.

FIG. 5B shows a data structure 550 of an event notification according to an embodiment of the present invention. Data structure 550 can be included in or implemented as a message (e.g., message 224) sent from notification server 202 to provide an event notification to a client. Data structure 550 can include record 552 that has information from a notification record (e.g., notification record 222) generated for an event. The contents for data structure 550 are shown as examples of one format of many formats of event notifications that can be used in content management system 100.

In some embodiments, data structure 550 can include fields similar to those in notification record 502. Data structure 550 can include a notification key field 515 indicating a notification key for which the client has registered. Data structure 550 can include content change field 525 including information such as content that has changed which serves as a basis for an event notification. A command field 535 in data structure 550 can indicate how information in content change field 525 is to be changed or presented to the user. While notification record 502 is shown as including content change and a command, information in an event notification can include any information describing an event that occurred in the content management system. For instance, although not shown, message 550 can include information referencing a location of event record 502 in notifications data store 210. As explained earlier, a client can obtain event notification 502 from notifications data store 210 using the reference in message 550 received by client.

Message 550 can include recipient field 545 indicating one or more intended recipients (e.g., clients) that are to receive an event notification based on message 224. In FIG. 5B, recipient field 545 includes two intended recipients, a first client "CLIENT1," e.g., client 112, and a second client "CLIENT2," e.g., client 114, that are to receive an event notification about a change in CHAT_SUBSCRIBERS. Recipient field 545 can be populated by notifier 242 using data structure 400 to identify clients registered for a notification key indicated notification key field 515.

Figure 6:
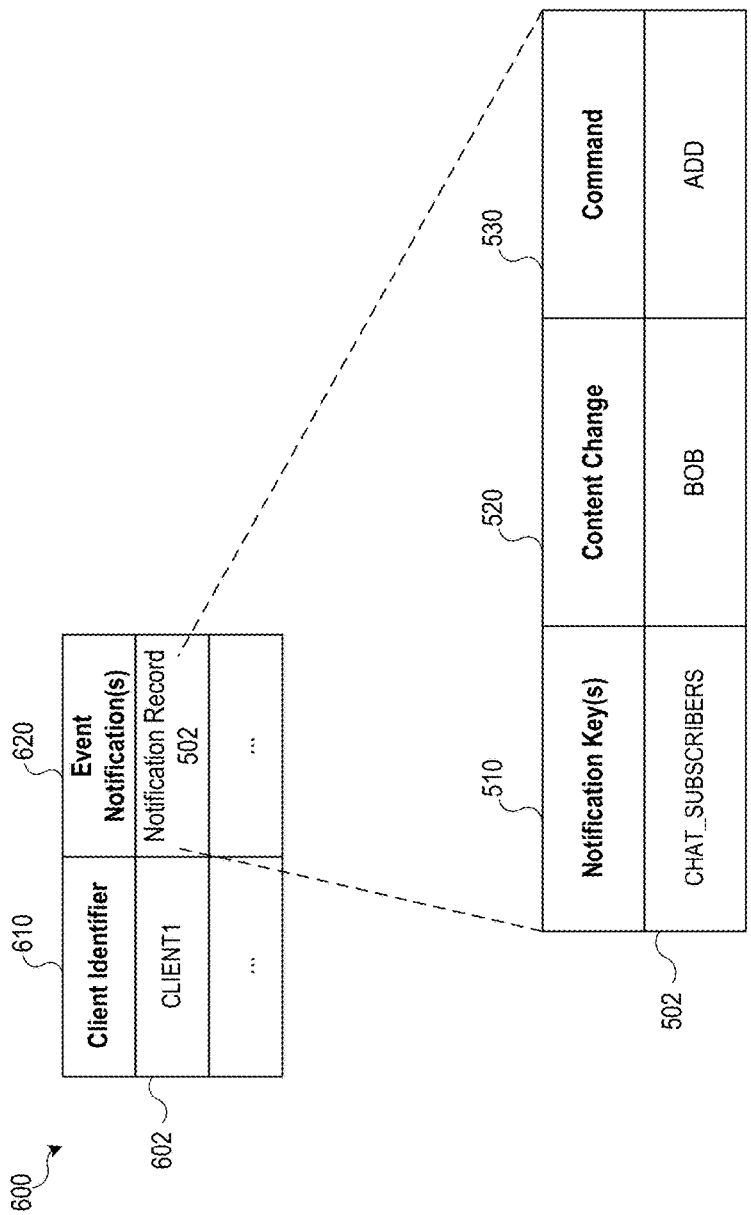
FIG. 6 shows a data structure for missed event notifications according to an embodiment of the present invention.

FIG. 6 shows a data structure 600 for missed event notifications according to an embodiment of the present invention. Specifically, data structure 600 can store information identifying missed event notifications for a client. Data structure 600 can be implemented in missed events data store 214. The contents for data structure 600 as shown as examples of a form of event notifications that can be used in content management system 100.

Data store 600 can include one or more records containing information about missed event notifications. In certain embodiments, a record, such as record 602, can include a field 610 that indicates one or more client identifiers of clients that missed a particular event notification. A record in missed event notification can reference (or contain) a notification record for an event notification that was missed. In FIG. 6, field 620 of record 602 contains a notification record (e.g., notification record 502 of FIG. 5) that could not be sent to the client identified in field 610.

Although data structure 600 is shown as storing event notifications in association with a client identifier, event notifications can be stored based on any other field, including fields in an event notification. For example, event notifications can be stored based on notification keys. The contents for data structure 600 are shown as examples of a format for storing one or more notification records that can be used in event notifications queue 308.

In some embodiments, each record in a missing event notification structure can include a time stamp (e.g., a time and date) when the event notification was generated and/or sent. The timestamp can be used by notification server 202 in determining which event notifications were not sent to a client.

In certain embodiments, data structure 600 can be managed according to a maximum size. The maximum size can be used to determine a number of records indicating missed event notifications that can be stored. In the event that a maximum size has been reached, notifications server 202 can purge, or delete records of missed event notifications in missing event notification structure 600 until a number of missing event notifications is less than the maximum size.

The data structures in FIGS. 4, 5A, 5B, and 6 are illustrative, and variations and modifications are possible. A notification record can include any number of fields and can have more or fewer fields than shown. Similarly, the number and content of fields in an event notification can be different from that shown. Using data structures such as those of FIGS. 4, 5A, 5B, and 6, online content management service 110 of FIG. 1 can selectively send notifications to clients. Examples of processes that can be implemented at notification server 202 and clients 112, 114, 116, 118 to manage distribution of event notifications will now be described.

Figure 7:
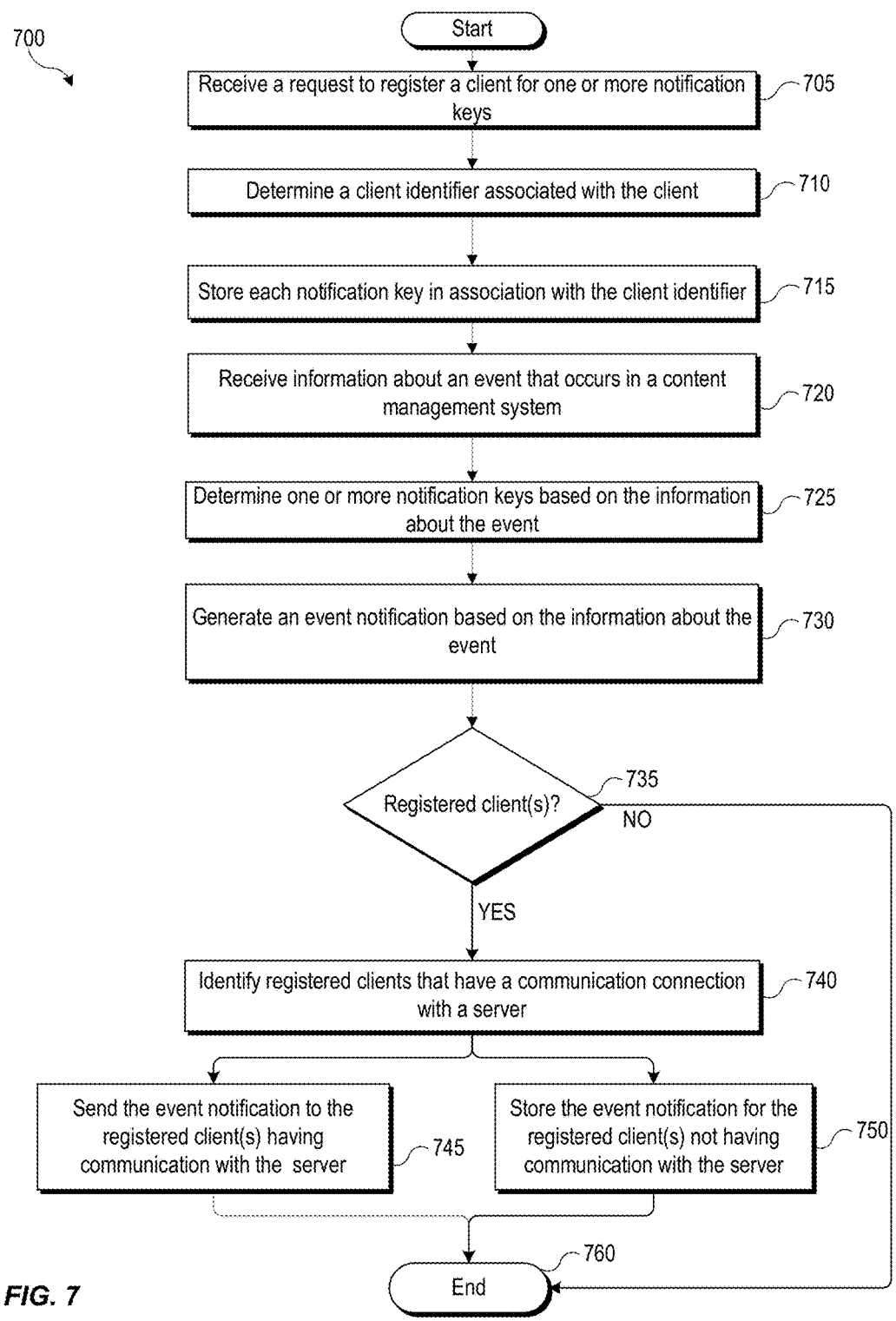
FIG. 7 shows a flow diagram of a process for managing distribution of event notifications according to an embodiment of the present invention.

FIG. 7 is a flow diagram of a process 700 for managing distribution of event notifications according to an embodiment of the present invention. Process 700 can be implemented by a server computer, e.g., notification server 202 of FIG. 3.

Starting at block 705, process 700 can include receiving a request to register a client (e.g., client 112 of FIG. 1) for one or more notification keys. As explained above, a notification key can correspond to a type of an event that occurs in a content management system.

The request can include identification information which identifies the client to notification server 302. The identification information can enable notification server 302 to further distinguish requests received from different clients. For example, the identification information can include an internet protocol (IP) address, a device address, a device name, an email account associated with client 112, an account provided by an online content management service (e.g., online content management service 110), a client identifier previously generated by notification server 202, or other information identifying client 112.

At block 710, process 700 can include determining a client identifier associated with the client from which a request was received (at block 705). In some embodiments, block 710 can be performed the first time a client requests to register for any notification key. For instance, notification server 202 can generate a client identifier distinguish the client from other clients registered to receive event notifications. In some embodiments, the client identifier can be based on identification information include in the request received from the client. For instance, if client was assigned an ID in connection with a previous request to register, client can include that ID in all subsequent requests to notification server 202.

At block 715, process 700 can include storing each of the one or more notification keys identified in the request at block 705 in association with the client identifier determined at block 710. For example, notification server 202 can store a registration data record including the client identifier at client registration data store 216.

At block 720, process 700 can include receiving information about an event that occurs in a content management system (e.g., system 200). For instance, notification server 202 can receive event information 220 for an event that occurs in system 200.

At block 725, process 700 can include determining one or more notification keys for the event based on the information about the event. For example, notification generator can analyze the information about the event to identify one or more notification keys that are applicable to the event. At block 730, process 700 can include generating an event notification based on the information about the event. For example, notification server 202 can generate notification record 222 based on the information about the event.

At block 735, process 700 can include determining whether one or more clients (e.g., client 112, client 114, client 116, or client 118) have registered to receive event notifications for one or more of the notification keys determined for the event. For example, notification server 202 can search client registration data store 216 to identify registration data records having any of the notification keys determined for an event. If it is determined that at least one client has registered for the notification keys, process 700 can proceed to block 740. If it is determined that no client has registered for the determined notification keys, process 700 can end (block 760).

At block 740, process 700 can include identifying the registered clients that are in communication with a server of a content management service (e.g., notification server 202). At block 745, process 700 can send the generated event notification to each registered client identified as having communication with the server. For example, notification server 202 can send a CSM (e.g., CSM 272, CSM 274, CSM 276, and/or CSM 278) to registered clients having communication with notification server 202.

Alternatively or additionally, at block 750, process 700 can include storing information about the generated event notification (e.g., a missed event notification) for each registered client that does not have communication with notification server 202. For example, notification server 202 can store information about an event notification in a missed notification record that is associated with a client identifier of the registered client that missed the event notification.

At block 760, process 700 can end or can proceed to block 705 to receive a request to register another notification key for a client or to block 730 to receive information about another event that occurs in the content management system.

Block 705-715 can be performed in an iterative manner for each client that requests to register for a notification key. Alternatively or additionally, block 720-750 can be performed in an iterative manner for each event that occurs in a content management system. It will be appreciated that process 700 is illustrative and that variations and modifications are possible. Action or operations described for process 700 as sequential may be executed in parallel and/or order of operations may be varied, and operations may be modified, combined, added or omitted. In another example, all or some of blocks 705-715 can occur after any or all of blocks 720-750.

Figure 8:
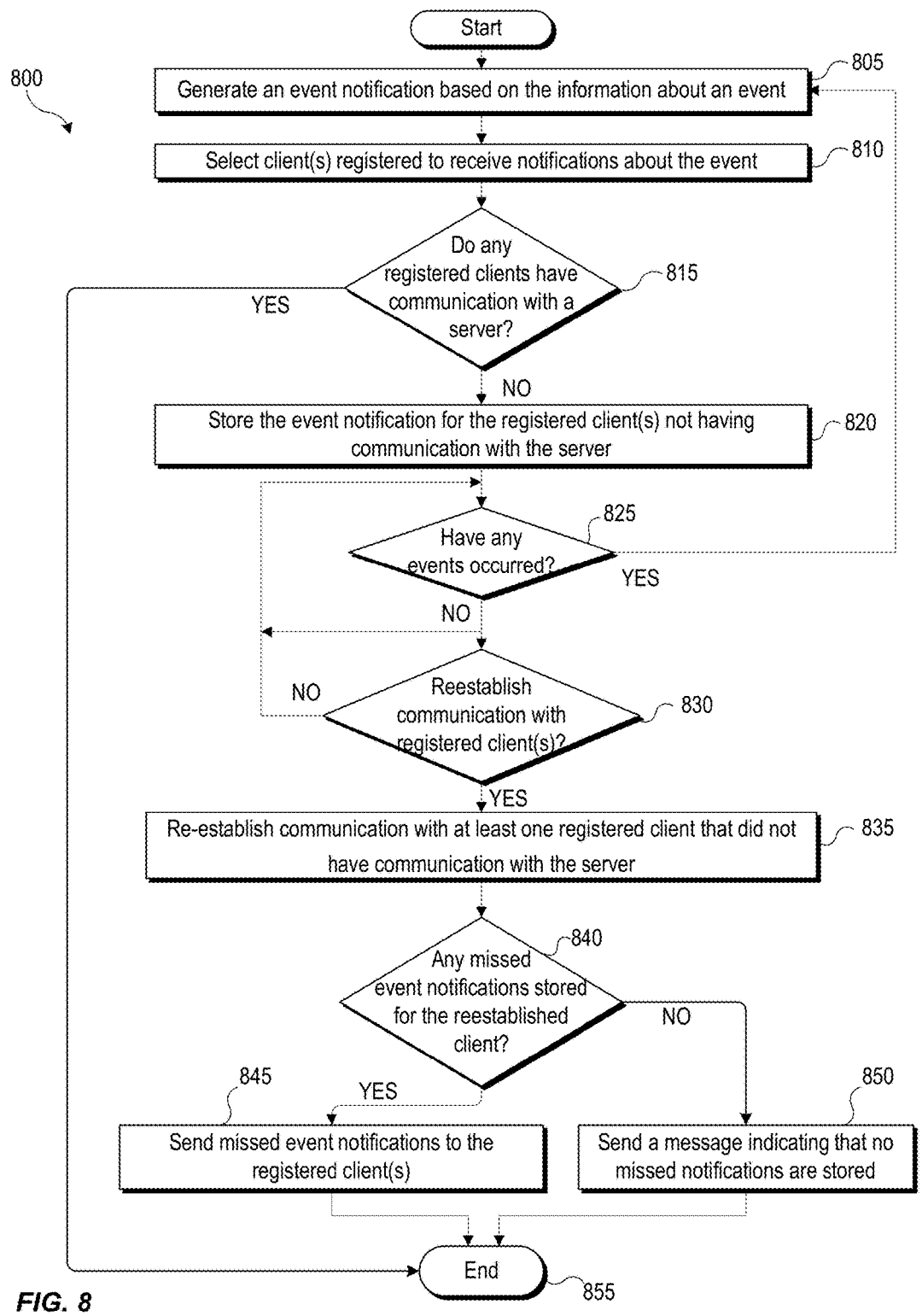
FIG. 8 shows a flow diagram of a process for managing distribution of event notifications according to an embodiment of the present invention.

Now turning to FIG. 8, a flow diagram is shown of a process 800 for managing distribution of event notifications according to an embodiment of the present invention. Specifically, process 800 can be used to store event notifications when a registered client loses communication with the content management service, then distribute the stored event notifications to the client subsequent to the client reestablishing communication with the content management service. In some embodiments, process 800 can be performed after one or more clients have already registered for one or more notification keys (e.g., using blocks 705-715 of process 700). Process 800 can be implemented by a server computer, e.g., notification server 202 of FIG. 2.

Starting at block 805, process 800 can include generating an event notification based on information about an event that occurs in a content management system (e.g., system 200 of FIG. 2). At block 810, process 800 can include selecting one or more clients that have registered to receive notifications about the event that occurs in the content management system. A registered client can be identified by one or more notification keys that correspond to the types of the event.

At block 815, process 800 can include determining whether any registered clients are in communication with notification server 202. If it is determined that all registered clients are in communication with notification server 202, process 800 can proceed to end (block 845). If it is determined that at least one registered client is not in communication with notification server 202, process 800 can proceed to block 820.

At block 820, process 800 can include storing information about the event notification for the registered clients that do not have communication with notification server 202. The information about the event notification can be stored in association with a client identifier for each of the registered clients that do not have communication with notification server 202. For example, notification server 202 can generate and store a missed notification record that contains a reference to the notification record 222 and that is associated with the client identifier of each registered client that do not receive the event notification. In some embodiments, blocks 805-820 can be repeated as new events are discovered in the content management system.

At block 825, process 800 can include determining whether any events have occurred in the content management system. If it is determined that one or more events have occurred in the content management system, then process 800 can proceed to block 805 to generate an event notification based on information about each of the events that have occurred. If it is determined that no events have occurred in the content management system, process 800 can repeat block 825 until additional events that occur in the content management system are discovered. In some embodiments, block 825 can be repeated periodically or intermittently to check for an occurrence of events. Alternatively or additionally, process 800 can proceed to block 830 if it is determined that no events have occurred in the content management system.

At block 830, process 800 can include determining whether communication with at least one registered client can be reestablished. In some embodiments, process 800 can periodically or intermittently check whether communication can be reestablished with at least one registered client. If it is determined that communication can be reestablished with at least one registered client, process 830 can proceed to block 835. If it is determined that communication cannot be reestablished with at least one registered client, then process 800 can return to block 825 to determine whether any events have occurred in the content management system. In some embodiments, blocks 825 and 830 can be repeated for a time period until either of an event occurs in the content management system or communication can be reestablished with at least one registered client.

At block 835, process 800 can include reestablishing communication with a registered client that did not have communication with notification server 202. In some embodiments, notification server 202 can reestablish communication with different client at different times or with multiple clients at the same time. Communication can be reestablished as each client regains communication with notification server 202. In some embodiments, communication can be reestablished with a registered client at point in time after notification server 202 loses communication with the registered client.

At block 840, process 800 can include determining whether any missed event notifications are stored for each of the registered clients that has reestablished communication with notification server 202. For example, notification server 202 can search missed events data store 214 to determine whether one or more missed notification records are stored in missed events data store 214 in association with the registered client that reestablished communication at block 835.

If it is determined that a missed event notification is stored for the client, process 800 can proceed to block 845. At block 845, process 800 can include sending, to the client, the missed event notifications stored in the missed notification records associated with the client identifier for the client in question. For example, using the missed notification record, notification server 202 can send a message to the client to provide the missed event notifications identified from the missed notification record. In some embodiments, a determination of whether to send missed event notifications can be performed by a process described below with reference to FIG. 9.

Now returning to block 840, process 800 can proceed to block 850 if it is determined that no missed event notifications are stored for the client. At block 850, process 800 can include sending a message to the client indicating that no missed event notifications are stored for the client.

Blocks 805-820 can be performed in an iterative manner each time an event notification is generated for an event that occurs in a content management system. Blocks 835-850 can be performed in an iterative manner each time a client registered to receive a notification about the event reestablishes communication with the server. It will be appreciated that process 800 is illustrative and that variations and modifications are possible. Action or operations described for process 800 as sequential may be executed in parallel and/or order of operations may be varied, and operations may be modified, combined, added or omitted. In some embodiments, process 800 can include updating a missed event notification record to remove a client ID for a client after delivery of corresponding missed event notification that client.

Thus, for event notifications that occur in a content management system during a time period when a client does not have communication with a server of an online content management service, process 800 can enable the online content management service to store missed event notifications and send them later, when the client reestablishes communication with the service. By storing information about event notifications in association with a client identifier of each client that misses an event notification, storage space for storage of event notifications in a content management system can be conserved such that duplicated information about events can be avoided. By storing event notifications in association with a client identifier, content management service 110 can easily identify and retrieve event notifications that were missed for particular registered clients.

Figure 9:
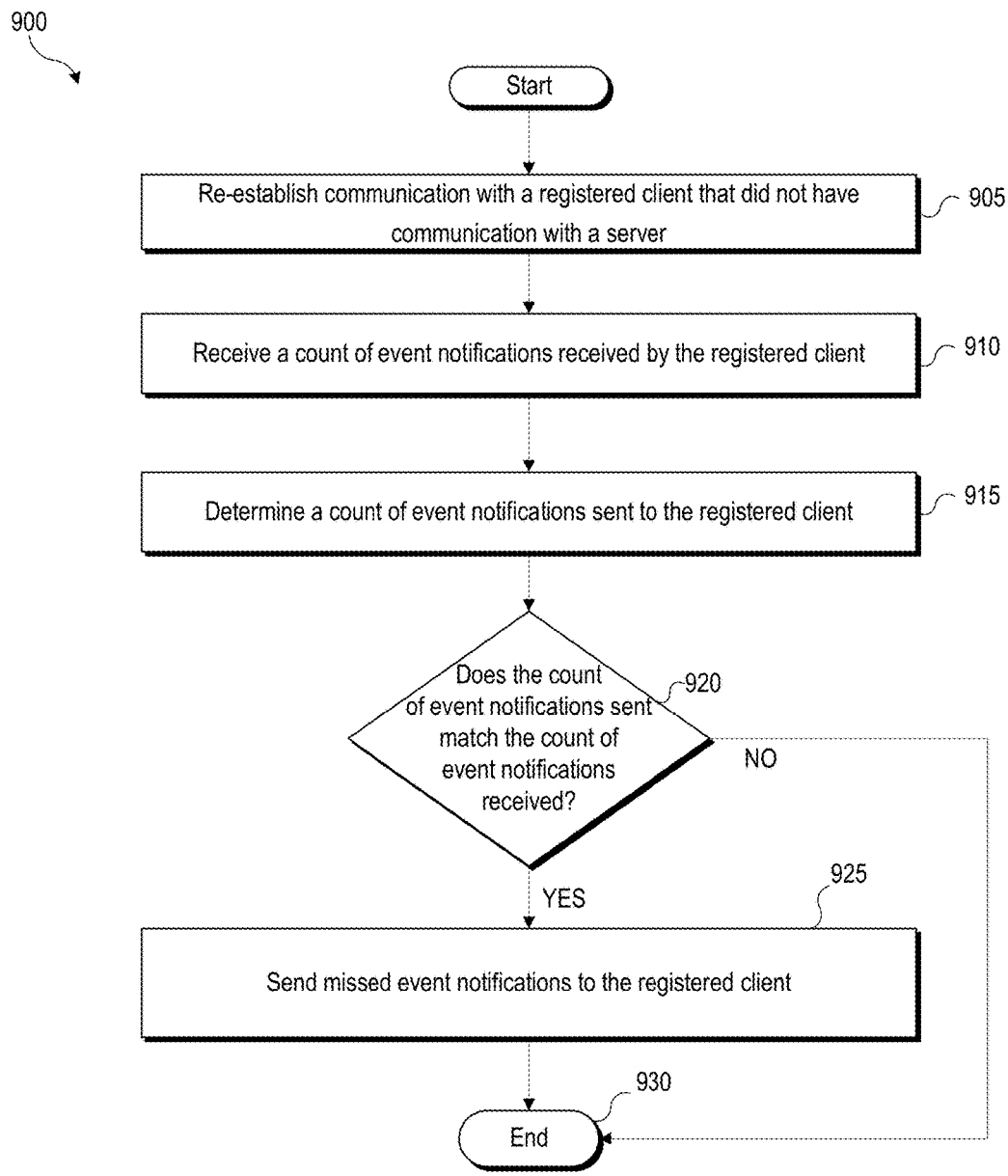
FIG. 9 shows a flow diagram of a process for synchronizing missed event notifications according to an embodiment of the present invention.

Now turning to FIG. 9, a flow diagram is shown of a process 900 for synchronizing missed event notifications according to an embodiment of the present invention. Specifically, process 900 can be used to determine whether to send missing event notifications to a registered client that reestablishes communication with the content management service. In some embodiments, process 900 can be performed after determining (at block 845 of FIG. 8) that content management service has stored missing event notifications to the registered client that has re-established communication with the content management service. Process 900 can be implemented by a server computer, e.g., notification server 202 of FIG. 2.

Starting at block 905, process 900 can include re-establishing communication with a registered client that did not have a communication connection with notification server 202 of FIG. 2.

At block 910, process 900 can include receiving, from the registered client that re-established communication, a count of event notifications received by that client when the client previously was in communication with the server. As explained earlier, a registered client can maintain a count of event notifications received from notification server 202. As described below with reference to FIG. 10, in some embodiments, the count of event notifications for a registered client can be received in a request for missed event notifications from the registered client.

At block 915, process 900 can include determining a count of event notifications sent to the registered client. As explained earlier, notification server 202 can maintain a count of event notifications that it has sent to the registered client.

At block 920, process 900 can determine whether the count of event notifications sent to the registered client match the count of event notifications received by the registered client. In some embodiments, process 900 can determine whether the counts differ by at least a threshold number. In some embodiments, the count of event notifications determined by notification server 202 may be based on a count of event notifications that notification server 202 attempted to send before knowing that it could not communicate with the registered client. In such embodiments, the count of event notifications notification server 202 sent to the registered client may different by a threshold number from the count of event notifications received by the registered client. Therefore, a threshold number can be defined to account for such difference between a count of event notifications notification server 202 sent to the registered client and a count of event notifications received by the registered client. In the event that the counts do not match, process 900 can end (at block 930). In the event that the counts do match, process 900 can proceed to block 925 where process 900 can send missed event notifications to the registered client.

Blocks 905-925 can be performed in an iterative manner for each registered client that re-establishes communication with a server of the content management service. Further, block 905-925 can be performed for each time content management service re-establishes communication with a registered client that did not have communication with the server. It will be appreciated that process 900 is illustrative and that variations and modifications are possible. Action or operations described for process 900 as sequential may be executed in parallel and/or order of operations may be varied, and operations may be modified, combined, added or omitted.

Thus, by verifying that a count of event notifications communicated by content management service to a registered client, the content management service can appropriately determine whether to provide missing event notifications to the registered client. In the cases when the counts do not match, the content management service can prevent the registered client from receiving event notifications that it may have already received.

Figure 10:
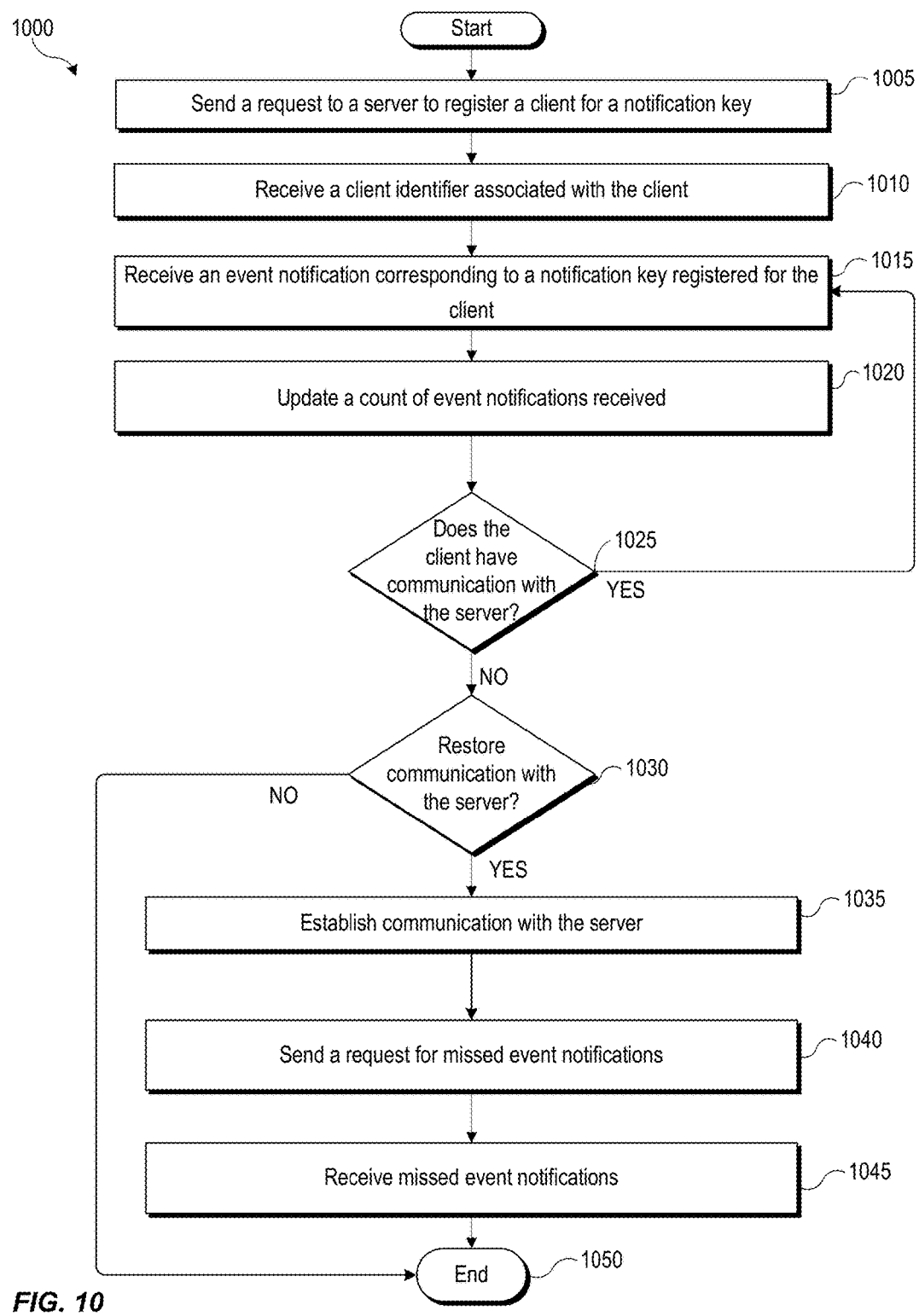
FIG. 10 shows a flow diagram of a process for receiving distribution of event notifications according to an embodiment of the present invention.

Now turning to FIG. 10, a flow diagram is shown of a process 1000 for receiving distribution of event notifications according to an embodiment of the present invention. Specifically, process 1000 allows a client to register with an online content management service to receive event notifications and to receive event notifications that are missed during a time period when the client cannot communicate with the online content management service. Process 1000 can be implemented by a client, such as one of clients 112, 114, 116.

Starting at block 1005, process 1000 can include sending to notification server 202 of content management service 110, a request to register a client (e.g., client 112) for one or more notification keys. At block 1010, process 1000 can include receiving a client identifier associated with the client that sends the request at block 1005. As explained above, notification server 202 can generate a unique client identifier when a client first registers a notification key. The client can include the client identifier in subsequent communications with notification server 202 to enable notification server 202 to recognize the client.

At block 1015, process 1000 can include receiving an event notification corresponding to a notification key for which the client is registered. Once a client has registered to receive event notifications for a notification key, an event notification can be received from notification server 202 when an event notification is sent to the client. At block 1020, process 1000 can include updating a count of event notifications received from notification server 202. The count can be updated by incrementing it each time the client receives an event notification from notification server 202. As explained above, the count can be included in a subsequent request to receive missed event notifications. The updated count can be used by notification server 202 to determine whether notification server 202 should send missed event notifications if any exist.

At block 1025, process 1000 can include determining whether the client has communication with notification server 202. Communication between a client and notification server 202 can be lost for a variety of reasons. The client can check periodically or intermittently whether it has communication with notification server 202. If it is determined that the client has communication with notification server 202, process 1000 can return back to block 1015 where it can wait until another event notification is received. If it is determined that the client does not have communication with notification server, process 1000 can proceed to block 1030.

At block 1030, process 1000 can include determining whether to restore communication with notification server 202. In some embodiments, a client can decide to restore communication with notification server 202 on behalf of a user who wishes to receive event notifications registered for the client. The client can determine to restore communication with notification server 202 based on determining that the client has lost communication with notification server 202. In certain embodiments, a decision to restore communication with notification server 202 can be based on whether communication is enabled for the client. If it is determined that communication with notification server 202 cannot be restored, process 1000 can proceed to end (block 1050) or wait until a later time to restore communication. If it is determined that communication with notification server 202 can be restored, process 1000 can proceed to block 1035.

At block 1035, process 1000 can include establishing communication with notification server 202 in response to the determination to restore communication with notification server 202.

At block 1040, process 1000 can include sending a request to notification server 202 for any missed event notifications. The missed event notifications can be event notifications that the client did not receive when the client did not have communication with notification server 202. In certain embodiments, the request can include the count of event notifications previously received when client had communication with notification server 202 before the client lost communication. At block 1045, process 1000 can include receiving missed event notifications (if any) from notification server 202.

In certain embodiments, process 1000 can return to block 1005 to register for additional notification keys. Process 1000 can also return to block 1015 to receive event notifications when the client is in communication with notification server 202. Process 1000 can also periodically or intermittently return to block 1025 to determine whether the client can communicate with notification server 202.

Blocks 1005-1010 can be performed in an iterative manner each time a client decides to register to a different notification key. Alternatively or additionally, blocks 1015-1020 can be performed in an iterative manner whenever notification server 202 sends an event notification about an event that occurs in the content management system. Blocks 1035-1045 can be performed for each client device that re-establishes communication with the server. It will be appreciated that process 1000 is illustrative and that variations and modifications are possible. Action or operations described for process 1000 as sequential may be executed in parallel and/or order of operations may be varied, and operations may be modified, combined, added or omitted. For example, blocks 1025-1045 can be performed before blocks 1015 and 1020 in the event that client decides to check its communication before an event notification is received. In another example, client can request to register for additional notification keys at any time before or after any of blocks 1015-1045. A client can request to deregister for each notification key registered for the client.

Used together, processes 700, 800, 900, and 1000 (or similar processes) can enable clients to stay updated with events occurring in a content management system. Events can be distributed to any or all clients, and notifications can be provided in real time when clients have communication with the content management service. Notifications can also be stored and delivered to a client at a later time when the clients can communicate with content management service. Since delivery of notifications to any one client is independent of delivery to any other client, clients connected to a content management service can receive notifications about an event regardless of whether other clients are or are not connected to the content management service.

While the invention has been described with respect to specific embodiments, one skilled in the art will recognize that numerous modifications are possible. For example, the particular events, data structures, and platforms described herein are used for purposes of illustration; other events, data structures, and platforms can be substituted. Techniques for sending notification of events to clients can also be modified as appropriate for a particular client.

In certain embodiments, it is not required that every notification sent to a client result in an alert at the client. Where a notification does result in an alert, the alert can be presented to a user in any manner desired; an alert can incorporate visual elements (text, icons or images, colors, etc.), audible elements (tones, spoken words, etc.), tactile elements (vibrating or pulsing, etc.), and/or any other perceptible element or elements. Wherein a notification does not cause a client to provide an alert, the client can take additional action in response to the notification. For example, the client can use information in the notification to update an application to indicate a change in content based on information included in the notification.

Although certain embodiments are described with reference to clients that can communicate with online content management service to register and receive event notifications, one skilled in the art can appreciate that clients can also be a source of an event that occurs in a content management system. In such embodiments where a client is a source of an event, the client can provide online content management service with event information about the event.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    defining, by a content management system, a notification key for a specific category of events at the content management system, the notification key comprising a unique value that uniquely identifies the specific category of events at the content management system;
    receiving, by the content management system, a request to register a client device to receive notifications of events corresponding to the notification key, wherein the client device is associated with a user account of the content management system, and the content management system stores one or more content items for the user account;
    in response to the request, storing, by the content management system, an association between the notification key and a unique client identifier of the client device, wherein the association registers the client device to receive notifications of events associated with the notification key;
    classifying one or more events detected by the content management system as corresponding to the specific category of events;
    based on the classifying of the one or more events as corresponding to the specific category of events, assigning the notification key to the one or more events to yield an assigned notification key associated with the one or more events;
    based on the assigning of the notification key, determining that the client device is registered to receive an event notification;
    sending, during a time period, the event notification for the one or more events of the assigned notification key to the client device;
    storing, by the content management system, the event notification as a missed event notification for future delivery to the client device when the client device is unable to communicate with the content management system during the time period, wherein the missed event notification is stored with the unique client identifier and the assigned notification key;
    receiving, from the client device, a count of event notifications received by the client device for the assigned notification key during the time period;
    determining a count of event notifications associated with the assigned notification key for the client device during the time period;
    determining a count of event notifications associated with the assigned notification key sent to the client device during the time period;
    determining a count of event notifications not received by the client device during the time period for the assigned notification key based on the count of event notifications received by the client device for the assigned notification key during the time period, the count of event notifications associated with the assigned notification key for the client device during the time period, and the count of event notifications associated with the assigned notification key sent to the client device during the time period;
    determining that event notifications not received by the client device for the time period exceed a threshold, based on the count of event notifications not received by the client device during the time period for the assigned notification key; and
    determining to send missed event notifications to the client device for the time period, based on event notifications not received by the client device for the time period exceeding the threshold.

2. The method of claim 1, wherein the specific category of events comprises changes to a content item on the content management system, and wherein the event notification includes an indication of a change to the content item.

3. The method of claim 1, further comprising:
determining, by the content management system, that a client device from the one or more identified recipient devices is unable to receive the event notification from the content management system based on a communication status associated with the client device;
associating, by the content management system, the missed event notification with an expiration setting defining an expiration triggering event, wherein the expiration triggering event causes the missed event notification to be removed from a list of missing event notifications associated with the client device, the expiration triggering event comprising at least one of an exceeding a period of time associated with the missed event notification, exceeding a number of missing event notifications in the list of missing event notifications, or exceeding a storage amount used by missing event notifications associated with the client device;
determining that the missed event notification has not expired when the expiration triggering event defined in the expiration setting has not been detected; and
based on a new communication status associated with the client device that indicates that the client device has established communication with the content management system, sending, by the content management system, the missed event notification to the client device when the missed event notification has not expired.

4. The method of claim 3, further comprising:
identifying a second missed event notification that has not been sent to the client device;
determining that the second missed event notification has expired based on the expiration triggering event; and
in response to determining that the second missed event notification has expired, disassociating the respective unique client identifier of the client device from a respective notification key associated with the second missed event notification.

5. The method of claim 1, further comprising:
generating a notification record associated with the notification key, the notification record comprising a plurality of fields comprising:
a first field corresponding to the notification key, the first field containing the unique value associated with the notification key,
a second field corresponding to devices registered to the notification key, the second field containing the respective unique client identifier,
a third field indicating a content item associated with the one or more events corresponding to the notification key, and
a fourth field indicating a command applied to the content item via the one or more events;
generating the event notification based on the notification record associated with the notification key, the event notification comprising a first indication of the content item associated with the third field and a second indication that the command associated with the fourth field has been applied to the content item; and
wherein storing the association in response to the respective request comprises adding the respective unique identifier of the one or more client devices to the second field corresponding to devices registered to the notification key.

6. The method of claim 1, further comprising:
determining, by the content management system, that a client device from the one or more identified recipient devices is unable to receive the event notification from the content management system based on a communication status associated with the client device;
in response to a new communication status associated with the client device, determining that the client device did not previously receive the missed event notification; and
sending the missed event notification to the client device, wherein sending the missed event notification to the client device is further based on determining that the client device did not previously receive the missed event notification.

7. The method of claim 6, further comprising:
maintaining, by the content management system, a first count of event notifications sent to the client device;
receiving, from the client device, a notification request for event notifications that were not previously received by the client device;
receiving, from the client device, a second count of event notifications the client device has previously received from the content management system;
comparing the first count with the second count to verify whether the notifications sent to the client device have been received by the client device;
in response to determining that the second count matches the first count, confirming, by the content management system, that one or more event notifications identified by the content management system as missed event notifications, were not previously received by the client device; and
in response to the confirming, sending to the client device the one or more event notifications that were not previously received by the client device.

8. The method of claim 6, further comprising:
determining, by the content management system, a first count of event notifications sent to the client device;
receiving, from the client device, a second count of event notifications previously received by the client device; and
in response to determining that the second count does not match the first count, determining, by the content management system, an at least one event notification sent to the client device that was not received by the client device.

9. The method of claim 1, further comprising:
receiving a delete request to delete registration of the notification key for the at least one of the one or more identified client devices; and
in response to the delete request, removing the respective unique client identifier of the at least one of the one or more identified client devices from the association between the unique value and each respective unique client identifier.

10. The method of claim 1 further comprising:
determining, by the content management system, that a client device from the one or more identified recipient devices is unable to receive the event notification from the content management system based on a communication status associated with the client device;
in response to a new communication status associated with the client device, determining that the client device did not previously receive the missed event notification;
sending the missed event notification to the client device, wherein sending the missed event notification to the client device is further based on determining that the client device did not previously receive the missed event notification; and updating a count of event notifications sent to the client device in response to sending the missed event notification to the client device.

11. The method of claim 1, wherein the method further comprises:

defining, by the content management system, a second notification key for events related to a shared folder at the content management system, the second notification key comprising a unique value that uniquely identifies events of the shared folder at the content management system, wherein the second notification key is associated with the shared folder in the user account;

based on the assigning of the second notification key to events of the shared folder and each respective unique client identifier, determining which of a second plurality of client devices associated with the content management system are registered to receive an event notification for events of the shared folder to yield one or more second identified recipient devices, the one or more second identified recipient devices comprising the one or more client devices registered to receive notifications of events of the shared folder uniquely identified by the unique value associated with the second notification key; and sending the event notification for the shared folder to at least one of the one or more second identified recipient devices.

12. A system comprising:

one or more processors; and a non-transitory computer-readable storage medium having stored therein instructions which, when executed by the one or more processors, cause the one or more processors to:

define a notification key for a specific category of events, the notification key uniquely identifying the specific category of events;

storing an association between the notification key and a client identifier of a client device, wherein the association registers the client device to receive notifications of events corresponding to the notification key;

determine that the client device is registered to receive an event notification corresponding to the notification key;

determine whether the client device is currently able to receive the event notification from the system based on a communication status during a time period;

when the client device is currently able to receive the event notification during the time period, sending the event notification to the client device;

when the client device is currently unable to receive the event notification from the system during the time period:

store a missed event notification record indicating that the client device did not receive the event notification; and in response to determining that the client device has established communication with the system, sending the event notification to the client device based on the missed event notification record;

receive a count of event notifications received by the client device for the notification key during the time period;

determine a count of event notifications associated with the notification key for the client device during the time period;

determine a count of event notifications associated with the notification key sent to the client device during the time period;

determine a count of event notifications not received by the client device during the time period for the notification key;

determine that event notifications not received by the client device, for the notification key during the time period exceed a threshold; and determine to send missed event notifications to the client device, for the notification key, during the time period.

13. The system of claim 12, the non-transitory computer-readable storage medium storing additional instructions which, when executed by the one or more processors, cause the one or more processors to:

periodically check if the client device has established communication with the system; and wherein sending the event notification to the client device is performed only after determining that the client device has established communication with the system.

14. The system of claim 12, the non-transitory computer-readable storage medium storing additional instructions which, when executed by the one or more processors, cause the one or more processors to:

receive a request to register the client device for notifications from the specific category of events associated with the notification key; and store the association in response to the request to register the client device for notifications from the specific category of events.

15. The system of claim 14, the non-transitory computer-readable storage medium storing additional instructions which, when executed by the one or more processors, cause the one or more processors to:

receive a second request to deregister the notification key for the client device; and removing the respective unique client identifier of the client device from the association between the unique value associated with the notification key and the respective unique client identifier to deregister the client device from receiving notifications for the specific category of events.

16. The system of claim 12, the non-transitory computer-readable storage medium storing additional instructions which, when executed by the one or more processors, cause the one or more processors to:

subsequently to determining that the client device has established the communication with the system and prior to sending the event notification to the client device, determine whether the missed event notification record associated with the event notification is stored for the client device in a missed events data store; and based on the missed event notification record being stored for the client device in the missed events data store, send the event notification to the client device.

17. The system of claim 16, the non-transitory computer-readable storage medium storing additional instructions which, when executed by the one or more processors, cause the one or more processors to:

maintain a first count of event notifications sent to the client device, wherein the first count does not include event notifications associated with a respective missed event notification record; and receive, from the client device, a second count of notifications previously received by the client device;

comparing the first count to the second count to determine whether a first number of event notifications sent to the client device matches a second number of event notifications received by the client device;

when the first number of event notifications sent to the client device matches the second number of event notifications received by the client device, confirming that the event notification, associated with the respective missed event notification record, has not been previously received by the client device; and wherein the event notification, associated with the respective missed event notification record, is sent to the client device after confirming that the event notification, associated with the respective missed event notification record, has not been previously received by the client device.

18. The system of claim 12, the non-transitory computer-readable storage medium storing additional instructions which, when executed by the one or more processors, cause the one or more processors to:

remove, from a missed events data store, a second association of the respective unique client identifier with a second unique value of a second notification key associated with a second missed event notification record when the client device does not establish communication with the system before a timeout period.

19. A method comprising:

defining, by a content management system, a notification key for a category of events associated with content items at the content management system, the notification key identifying the category of events;

receiving, by the content management system, a request to register a client device to receive notifications of events corresponding to the notification key, wherein the client device is associated with a user account of the content management system;

classifying one or more events associated with content items at the content management system as corresponding to the notification key identifying the category of events;

based on the classifying of the one or more events, assigning the one or more events to the notification key;

based on the assigning of the notification key, determining that a client device is registered to receive event notifications associated with the notification key;

sending, during a time period, event notifications to the client device registered for the notification key;

receiving a first count of event notifications, wherein the first count of event notifications corresponds to a count of event notifications received by the client device for the notification key during the time period;

determining a second count of event notifications, wherein the second count of event notifications corresponds to a count event notifications associated with the notification key during the time period;

determining a third count of event notifications, wherein the third count of event notifications corresponds to a count event notifications associated with the notification key and sent to the client device during the time period;

determining a fourth count of event notifications, wherein the fourth count of event corresponds to a count of event notifications associated with the notification key and not received by the client device during the time period, and based on the first count, the second count, and the third count of event notifications; and determining that the fourth count of event notifications for the time period exceeds a threshold and sending missed event notifications to the client device for the time period.

\* \* \* \* \*